United States Patent [19]

Shepherd

[11] 4,115,008

[45] Sep. 19, 1978

[54] DISPLACEMENT MEASURING APPARATUS

[75] Inventor: Alexander Turnbull Shepherd, Edinburgh, Scotland

[73] Assignee: Ferranti Limited, Hollinwood, England

[21] Appl. No.: 794,523

[22] Filed: May 6, 1977

[30] Foreign Application Priority Data

May 8, 1976 [GB] United Kingdom ............... 19049/76

[51] Int. Cl.² ......................... G01B 11/26; G01B 9/02; G02B 27/38

[52] U.S. Cl. ............................... 356/172; 250/237 G; 356/169

[58] Field of Search ............... 356/169, 111, 151, 120, 356/172; 250/237 G, 231 SE, 550; 350/81

[56] References Cited

U.S. PATENT DOCUMENTS 3,586,665  6/1971  Weyrauch ............................ 356/169
3,879,136  4/1975  Takeda ............................. 250/237 G

FOREIGN PATENT DOCUMENTS 991,710  5/1965  United Kingdom ................ 250/237 G
782,831  9/1957  United Kingdom ..................... 356/169

OTHER PUBLICATIONS

Design Digest "Projection Measuring System Uses Moire Fringe Techniques", OEM Design, 11-1976, p. 14.

Primary Examiner—John K. Corbin
Assistant Examiner—Wm. H. Punter
Attorney, Agent, or Firm—Cameron, Kerkam, Sutton, Stowell & Stowell

[57] ABSTRACT

Apparatus for measuring the extent and sense of relative movement between two objects comprises a reflecting ruled grating carried on one body and optical reading head carried on the other. The reading head includes a light source arranged to produce at least three light beams which are directed at the grating and reflected therefrom onto a mirror twisted about a line parallel to the grating lines. This mirror reflects the light beams onto a different area of the grating from which they are reflected to separate light-sensitive devices. Lenses are used to focus the light beams as required.

4 Claims, 3 Drawing Figures

DISPLACEMENT MEASURING APPARATUS

This invention relates to apparatus for measuring the extent and sense of the relative movement of a first object in one of two opposite directions with respect to a second object.

Measurement of the relative movement of two objects is frequently required particularly in the machine tool and inspection fields. Many systems are known for performing such measurements and common amongst these are systems using moire fringes produces by a pair of optical gratings carried one on each of the objects. Our British patent specifications Nos. 760,321 and 810,478 describe systems of this type. Systems such as those described in these two specifications, and many others, require a very close gap between the two optical gratings and are very sensitive to changes in the spacing and in the relative alignment of the two gratings. In addition they are affected by contamination of the grating surfaces by oil, cutting fluid, swarf or other materials which may obscure part of the grating surface.

In particular, previous systems have derived their anti-phase balancing signals from separate areas of grating, so that non-uniform contamination affected these to a different extent, resulting in system failure.

To avoid problems of this nature it has therefore been necessary to provide very accurate guideways for the moving parts of the apparatus, and to provide means for excluding, so far as is possible, materials which will contaminate the grating surfaces.

It is an object of the invention to provide apparatus for measuring the extent and sense of the relative movement of two objects which does not suffer from the above-mentioned disadvantages.

According to the present invention there is provided apparatus for measuring the extent and sense of the relative movement of a first object in one of two opposite directions with respect to a second object which includes a reflecting grating carried by one of the two relatively movable objects with the grating lines substantially at right angles to the direction of relative movement, and an optical system carried by the other of the two relatively movable objects and comprising a light source arranged to produce at least three light beams equally spaced in a direction substantially parallel to the grating lines, a first lens having the light source located in its focal plane and arranged to project the light beams onto an area of the grating for reflection thereby, a second lens arranged to focus the light beams reflected from the grating onto a mirror having a uniform twist about an axis substantially parallel to the grating lines, a third lens having the mirror located substantially in its focal plane and arranged to project the light beams reflected by the mirror onto a different area of the grating for further reflection thereby, and a fourth lens arranged to focus each further reflected light beam onto a separate light-sensitive device.

An embodiment of the invention will now be described with reference to the accompanying drawings, in which.

Figure 1:
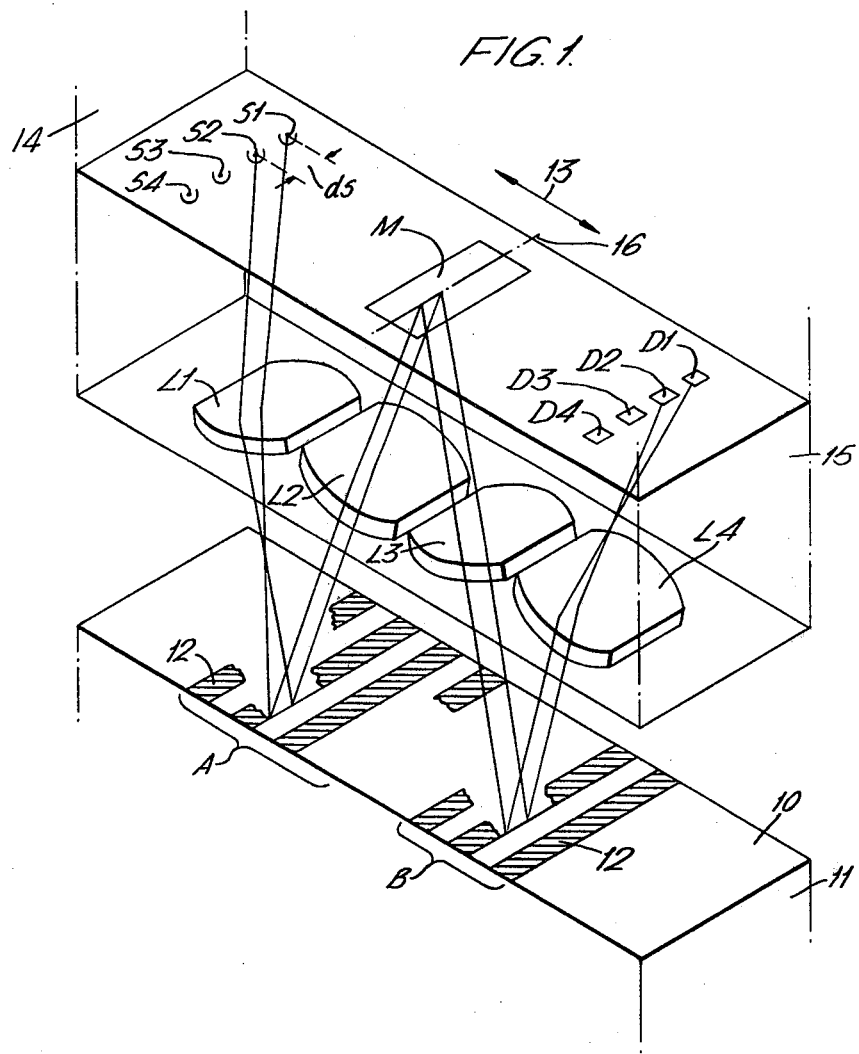
FIG. 1 is a schematic view of a grating and optical system.
Figure 2:
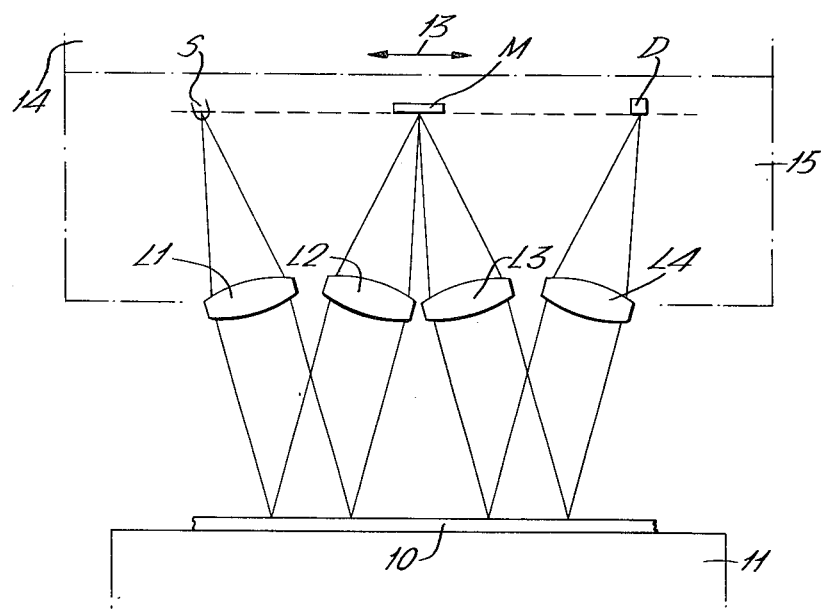
FIG. 2 is a schematic side view of the arrangement of FIG. 1.

Referring now to FIGS. 1 and 2, a reflecting grating 10 is attached to the fixed bed of a machine, shown schematically at 11, and aligned so that the grating lines 12 extend at right angles to the direction of movement of the machine carriage (shown by the line 13). The carriage itself, shown schematically at 14 in FIG. 2, carries an optical system 15. The details of the optical system are shown in FIG. 1.

Four separate light sources S1 to S4 are equally spaced at distances dS in the focal plane of a first lens L1 in a direction parallel to the grating lines. These four sources produce four collimated beams passing through lens L1 and illuminating an area A of the grating 10. The four light beams are modulated by the grating pattern and are reflected through a second lens L2, which brings the beams to a focus on the surface of a mirror M.

The mirror M is a reflector which is sufficiently resilient to be given a uniform twist about an axis 16 parallel to the grating lines 12. The method of producing the twist will be described later. The mirror M is located not only in the focal plane of lens L2, but also in the focal plane of a third lens L3. This directs the now displaced beams of light onto an area B of the grating 10 close to but distinct from the area A referred to above. The grating again reflects the four beams of light, and these are finally focussed by a fourth lens L4 onto four separate light-sensitive detectors D1 and D4.

The four light beams from the sources S1 to S4, lenses L1, L2, L3 and M cause four images of area A of the grating to be projected onto area B of the grating with relative displacements of ¼ pitch along the gratings which are produced by the twist in the mirror M. Interaction between the images of area A and area B results in the production of a moiré-fringe pattern in the image plane which is detected at 90° phase intervals by the four detectors D1 to D4. It will not be possible to see a visible image of area A of the grating on area B because the four superimposed images give uniform intensity in the grating plane. The images of the four sources falling on the four detectors are individually modulated with phase differences of 90°.

The twist given to the mirror M is such that each beam is displaced from the next in a plane normal to the grating lines by a distance equal to one quarter of a grating pitch, measured where the beams impinge on area B of the grating.

Movement of the optical system 15 relative to the grating 10 causes movement of the image of area A on area B in the opposite direction, due to reversal by the mirror. Hence the effect on the moiré-fringes produced by the interaction between the grating lines at area B and the projected quadrature modulated pattern is that of a double-pitch grating. Hence an automatic frequency-doubling effect occurs.

Because the light beams incident on the grating are parallel, the precise position of the grating relative to the optical system is not critical. Hence the spacing need not be maintained to very precise limits. The frequency-doubling effect referred to above also allows the use of a coarser grating for a given resolution. Because of the four-phase system used, in which two pairs of balancing signals are derived from substantially the same area of grating, the arrangement is relatively insensitive to non-uniform contamination of the surface of the grating, so long as this is not completely obscured.

Figure 3:
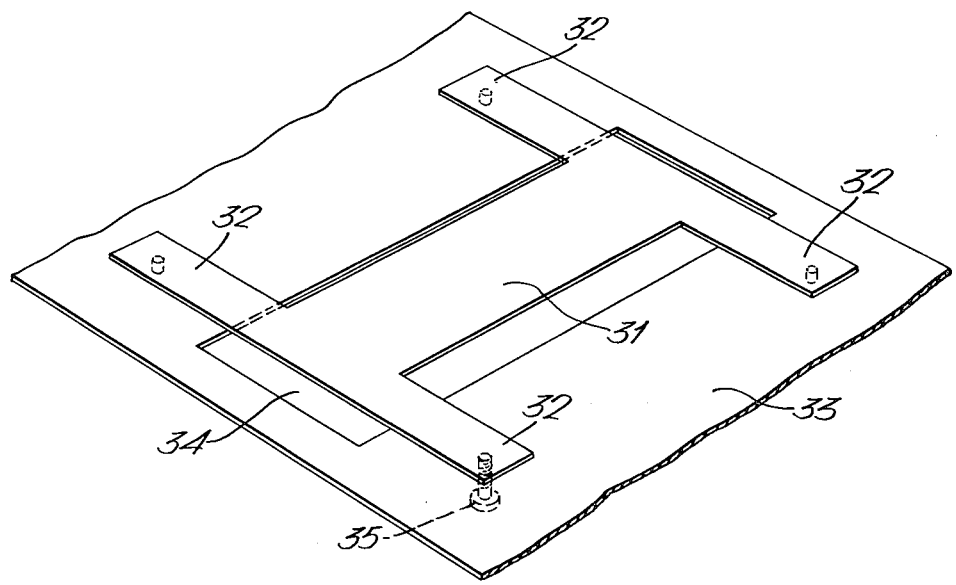
FIG. 3 shows the arrangement of the mirror of FIGS. 1 and 2.

The form of a twisted mirror is shown in FIG. 3. The central rectangular portion 31 is the reflecting area, whilst the four projecting arms 32 form the supports. Three of these are secured to a supporting member 33 so that the reflecting surface extends over an aperture 34. The fourth arm rests on an adjusting screw 35, the resilience of the mirror itself serving to keep the arm in contact with the screw. By suitable adjustment of the screw any desired degree of twist may be imparted to the mirror in order to give the correct phase shifting for different grating pitches. The mirror and its adjustment may take other forms than that described.

The electronic circuitry used to count the fringes and derive the required indication of the sense and extent of any movement between the grating and the optical system is not described. Many suitable four-phase circuits are known, and such circuitry does not form part of the invention.

To obtain maximum benefit from the signals produced by the system, they should be applied in antiphase pairs to amplifiers with good common mode rejection and which operate over a wide range of amplitude. This is necessary since contamination of the grating will result in a significant loss of amplitude but will maintain a stable d.c. balance condition.

In the embodiment described above, four separate light sources were used. There may conveniently be light-emitting diodes, though other sources may also be used. Alternatively a single elongated source may be used, extending in a direction parallel to the grating lines. The term "light" is taken to include electromagnetic radiation of any suitable wavelength, though the apparatus will usually be used with visible light.

The four lenses L1 to L4 may be formed from one or more blocks of material and are conventional lenses of the spherical type.

What I claim is:

1. Apparatus for measuring the extent and sense of the relative movement of a first object in one of two opposite directions with respect to a second object, which includes a reflecting grating carried by one of the two relatively movable objects with the grating lines substantially at right angles to the direction of relative movement, and an optical system carried by the other of the two relatively movable objects and comprising a light source arranged to produce at least three light beams equally spaced in a direction substantially parallel to the grating lines, a first lens having the light source located in its focal plane and arranged to project the light beams onto an area of the grating for reflection thereby, a second lens through which the reflected light beams pass, a mirror located in the focal plane of the second lens and having a uniform twist about an axis substantially parallel to the grating lines such as to displace each light beam from the next in a plane normal to the grating lines by a distance measured at the grating surface equal to one quarter of the grating pitch, a third lens having the mirror located substantially in its focal plane and arranged to project the light beams reflected by the mirror onto a different area of the grating for further reflection thereby, a fourth lens through which the light beams pass after said further reflection from the grating, and at least three light-sensitive devices located in the focal plane of the fourth lens so that each detector receives a separate one of the light beams.

2. Apparatus as claimed in claim 1 in which the light source comprises a number of separate light-emitting devices each producing a separate one of said light beams.

3. Apparatus as claimed in claim 2 in which each light-emitting device is a light-emitting diode.

4. Apparatus as claimed in claim 1 in which the mirror comprises a reflecting surface from which extend four arms, at least one of the arms being movable by suitable adjusting means.

* * * * *